United States Patent Office 2,781,396
Patented Feb. 12, 1957

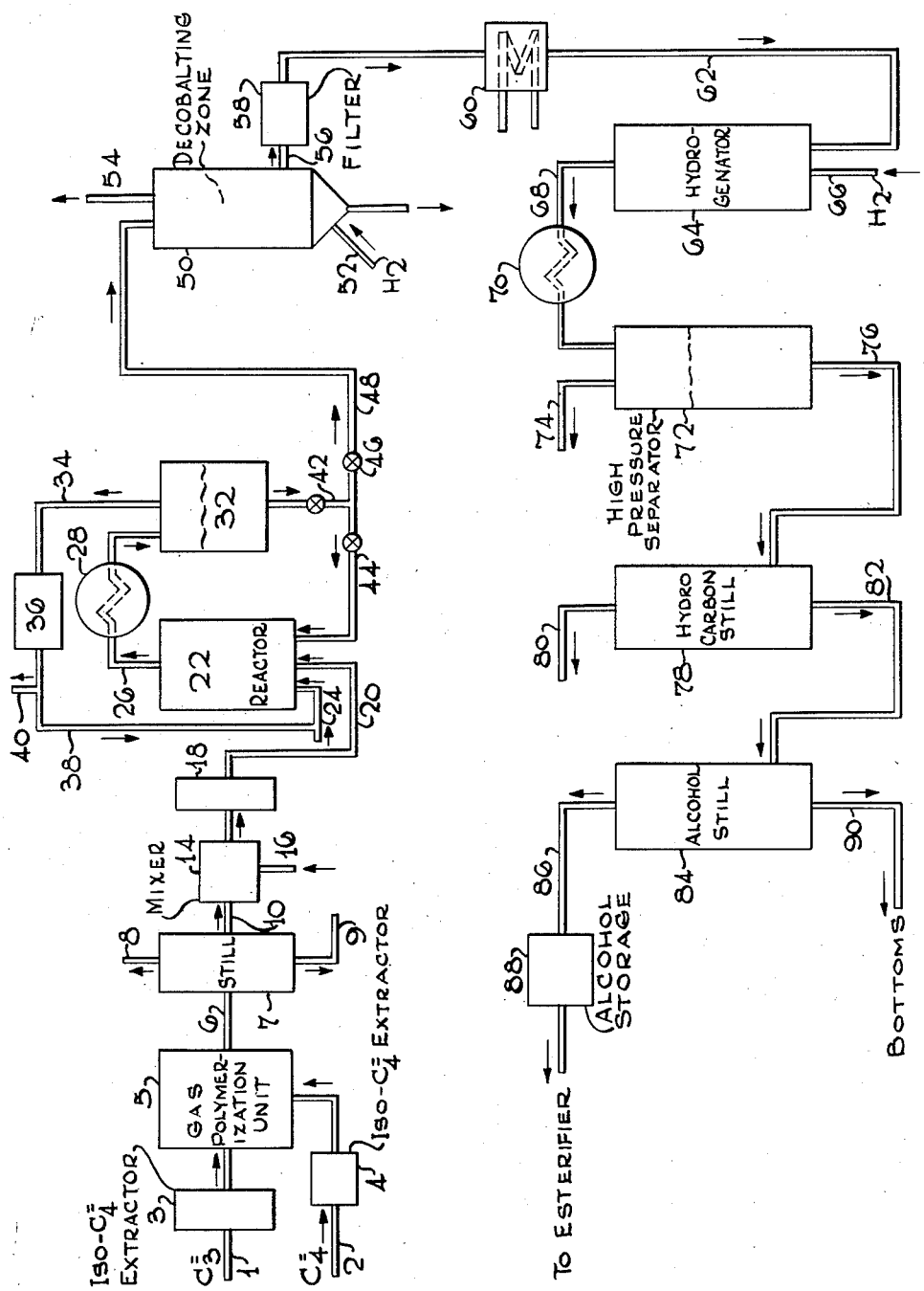
Feb. 12, 1957 — C. E. MORRELL — 2,781,396
PREPARATION OF OXO OCTYL ALCOHOLS AND PLASTICIZER ESTERS
Filed Feb. 24, 1954
Charles E. Morrell Inventor
By J. Cashman Attorney

2,781,396

PREPARATION OF OXO OCTYL ALCOHOLS AND PLASTICIZER ESTERS

Charles E. Morrell, Westfield, N. J., assignor to Esso Research and Engineering Company, a corporation of Delaware Application February 24, 1954, Serial No. 412,153

10 Claims. (Cl. 260—475)

The present invention relates to the preparation of oxygenated organic compounds by the reaction of carbon monoxide and hydrogen with olefinic hydrocarbons in the presence of a carbonylation catalyst. More specifically, the invention relates to improved mixtures of alcohols, specifically octyl alcohols prepared by operations involving interaction of carbon monoxide, hydrogen, and a hydrocarbon fraction comprising heptenes, and a cobalt carbonylation catalyst to form octyl aldehydes, and subsequent reduction of these aldehydes to octyl alcohols. The invention relates specifically to a composition of matter consisting of a mixture of alcohols which are particularly suitable as intermediates in the manufacture of plasticizers.

Primary alcohols of this type are of great economic importance and interest because of their use as intermediates in the manufacture of plasticizers such as those of the di-ester type. For this purpose these alcohols may be esterified with suitable acids such as phthalic, adipic, sebacic, phosphoric, aconitic, and other di- and polybasic acids to yield esters suitable as plasticizers for polyvinyl resins, cellulose acetate, cellulose ethers, cellulose nitrate and also for synthetic rubbers such as Buna S and the acrylonitrile-diolefin copolymers. Plasticizers are used in the compounding of these resinous and rubbery materials in order to increase flexibility, resistance to brittleness at low temperature and resiliency. Hitherto, these alcohols have been supplied on a commercial scale mainly by such comparatively costly procedures as aldol condensation of butyraldehydes, followed by dehydration, and hydrogenation of the unsaturated octyl aldehyde. It is a purpose of the present invention to disclose a novel and economically attractive process for manufacturing octyl alcohols which are particularly suitable for the manufacture of plasticizers of the di-ester type, such as octyl phthalate.

With the introduction of the carbonylation, or aldehyde synthesis reaction, it was attempted to prepare these octyl alcohols from various olefinic $C_7$ hydrocarbon fractions commercially available, i. e. from those produced on a scale large enough to provide a steady and available source of feed for the processing of alcohols on a commercial scale to supply a very large scale alcohol market. The olefin fractions readily available are principally those derived and resulting from the processing of petroleum distillation and residua. Thus, available on a large scale are olefine fractions from thermal and catalytic cracking processes, either directly or from polymerization of olefins derived from these cracking processes. These sources all produce, in large supply, olefin fractions containing substantial amounts of heptenes.

One of the most promising sources of supply of heptenes is the olefin polymerization process wherein low molecular weight olefins, such as propylene and butylenes, are polymerized in the presence of a catalyst, such as phosphoric acid on a siliceous carrier, to produce a large variety of olefinic products boiling in the gasoline range and above. Many refinery light end streams contain appreciable amounts of olefins, and these may readily be converted into polymeric olefins which hace considerably greater value as high octane gasoline. Most suitable for polymerization for the preparation of gasoline are the $C_3$ and $C_4$ and, in certain cases, $C_5$ olefins.

Desirable as it is to utilize these olefins from petroleum sources in the preparation of octyl alcohols, it has been found that alcohols thus prepared by reacting the heptene cut from a commercial olefin polymerization process with carbon monoxide and hydrogen at elevated pressures and temperatures in the presence of a cobalt catalyst are not completely satisfactory for the preparation of plasticizers. In particular, it has been found that the low-temparture characteristics of the di-phthalate ester-resin blends are not as good as is sometimes desired. Thus, it has been found that the resins plasticized with esters derived from olefins prepared by the conventional polymerization process tend to be brittle at low temperatures. The alcohols themselves, as well as the esters, appear to have high viscosities, and it is considered that lower viscosities contribute to better plasticizer properties at both high and low temperatures in blends with synthetic resins, such as those of the vinyl type.

It is an object of the present invention to disclose a process for obtaining an octyl alcohol product of improved high quality suitable as intermediate for the production of plasticizers.

It is also an object of the present invention to disclose a process for the preparation of an olefin feed suitable for preparing high quality primary octyl alcohols by means of the carbonylation reaction.

It is a still further purpose of the present invention to provide a new and economically attractive process for manufacturing octyl alcohols from cheap and readily available hydrocarbon material.

It is also an object of the present invention to disclose a mixture of constituents comprising essentially isomeric octyl alcohols, which mixture is particularly suitable as an intermediate in the production of plasticizers.

It is also an object of the present invention to disclose novel and hitherto undescribed octyl alcohols which are constituents of said aforementioned alcoholic mixture.

It is a still further object of the present invention to describe and set forth a composition comprising a mixture of isooctyl orthophthalates which composition has superior plasticizing characteristics.

Other purposes and advantages of the invention will become apparent from the more detailed discussion and description that follows.

Normally light ends polymerization plants are operated in refineries to convert a wide variety of lower olefinic materials to polymers suitable for use in gasoline. Ordinary practice is to include propylene, the butylenes and in certain cases, the amylenes, into polymer plant feed stocks. The portion of the resulting polymeric materials boiling in the $C_7$ range is dependent upon the composition of the olefinic feed stock as well as upon the operating variables of the polymerization process—such as temperature, pressure, contact time and the number of stages in the operation. In general, the amount of $C_7$ fraction in the total polymer increases with increase in butylenes in the feed stock and also, with increase in the temperature of operation. It is pictured that $C_7$ hydrocarbons in the polymerization process are derived not only from butylene-propylene copolymerization, but also, from demethylation or disproportionation reactions of higher molecular weight materials such as $C_8$ and $C_9$ polymers. Such disproportionation or demethylation reactions have a certain similarity to cracking and hence, as might be expected, occur with greater frequency as the temperature of the polymerization is increased. There are thus two ways of increasing the yield of $C_7$ olefins in a given polymer plant. These are: (1) increasing the butylene/ propylene ratio in the polymer plant feed, and (2) operating at as high a temperature as possible. However, even under the best conditions, the yields of C₇ olefins are fairly small compared to other constituents of the total polymer product and, under certain conditions, become limiting in supply when considering large scale alcohol production by the carbonylation or aldehyde synthesis reaction. It is obviously highly desirable to increase the C₇ olefin content of the polymeric product to provide cheap sources of this raw material for octyl alcohol production. As indicated above, heptenes from UOP polymer plant sources are converted to octyl alcohols by the carbonylation process and the alcohols esterified to produce plasticizers. The best plasticizer is, generally speaking, the one which bestows a given degree of flexibility, low temperature resistance to brittleness, and resiliency at the lowest plasticizer concentration in the overall compound. This is true largely as a result of economic considerations in that the plasticizer, in general, is more expensive than the resinous or rubbery material in which it is incorporated. It is obviously desirable, therefore, to produce by the carbonylation reaction from polymer plant olefins an alcohol which, on esterification with such acids as phthalic, adipic, sebacic, phosphoric, etc., yields esters of the highest possible efficiencies.

It has now been found that the plasticizer efficiencies of esters derived from octyl alcohols produced from polymeric C₇ olefins (i. e. heptenes derived from the polymerization of low molecular weight olefins with a phosphoric acid catalyst) are not uniform, but depend to a marked extent upon the nature of the olefins employed as feed to the polymer plant. That is, for a given polymerization temperature range, the heptene fraction yields octyl esters which are found to have different plasticizer efficiencies depending upon the nature of the olefins employed as feed to the polymer unit. Furthermore, it has been found that the magnitude of the effect of the feed stock composition varies with the temperature of the polymerization. More specifically, it has been found that alcohol products giving esters of superior plasticizer efficiencies are prepared by excluding isobutylene substantially completely from the feed to the polymer plant. Alcohols and esters of highest efficiencies were obtained by using exclusively propylene or propylene-ethylene mixtures and excluding, by suitable removal methods, all butylenes and higher hydrocarbons from the feed. It was found that although substantially pure propylene or propylene-ethylene mixtures are the most suitable olefin feeds in terms of alcohol and ester plasticizing properties, the addition of some butylenes is required in order to maintain high polymer yields; and it was also found that inclusion of isobutylene to this feed to the polymer plant increased substantially the viscosities and low temperature brittleness characteristics of the octyl alcohols and ester-resin blends. It was further found that inclusion of butylenes in the feed when operating at a higher temperature level (450° to 500° F.) in polymerization appears to have a more deleterious effect on the ester plasticizer efficiency than does the inclusion of a similar amount of butylene in a lower temperature operation (380°–400° F.).

As for the effect of the inclusion of isobutylene in the feed upon the resultant characteristics of the finished esters, it was found that normal butylenes and isobutylene in the same concentration levels in the polymer plant feed show relatively different effects in alcohol quality. Other conditions being the same a given concentration of isobutylene in the feed produces octyl alcohol esters of lower plasticizer efficiency than does an equal concentration of normal butylene in the feed. Thus, it has been determined that, though it is normally desirable from a product quality point of view to operate the polymerization process without any butylene at all, nevertheless, under those conditions where it is necessary for any reason whatsoever to feed butylenes to the polymer plant, it is most desirable to feed a stream essentially free of isobutylene and containing only normal butylenes. Such a butylene stream may be conveniently prepared by such methods as contacting appropriate refinery C₄ cuts such as those derived from catalytic or thermal cracking with sulfuric acid of about 65% concentration to extract the isobutylene therefrom.

Heretofore, the relationship between the composition of the olefin feed to the carbonylation process on one hand to the plasticizing characteristics of the alcohol and esters on the other hand has not been appreciated. In fact, it has been generally accepted that the greater the branchiness of the alcohol, the lower is its solidification point, and this property has been assumed to extend to the esters. The discovery has now been made that, by removing or keeping isobutylene out of the feed to the polymer unit, an olefinic product is obtained wherein the C₇ cut produces an alcohol and an ester with considerably better plasticizing properties than when the isobutylene is not removed. In a conventional olefin polymerization plant, isobutylene is, of course, not removed. As little as 2% on the total olefin fed to the polymer unit is undesirable.

In accordance with the present invention, wherein an octyl alcohol mixture of highly desirable properties suitable for conversion into ester plasticizers is prepared, propylene, either substantially pure or admixed with ethylene, is fed from a suitable refinery stream or other source to a conventional light ends polymerization unit. If desired, normal butylene from a suitable source is also fed to such unit. If necessary, these streams may be freed of isobutylene by passage through an isobutylene extraction unit wherein the isobutylene is extracted by a suitable extracting agent, for instance, 60 to 70% sulfuric acid which does not react with normal butylene or propylene at atmospheric or lower temperatures and pressures. The reaction conditions within the polymerization plant are controlled as described below to maximize C₇ olefin yields consistent with highest plasticizer efficiencies of the desired esters. The substantially isobutylene-free olefin or olefinic mixture is thus polymerized, the resulting olefin polymeric product fractionated and the heptene fraction subjected to the carbonylation reaction with carbon monoxide and hydrogen in the presence of a cobalt catalyst. The octyl aldehydes thus formed are then reduced to alcohols which may then be subjected to a catalytic or non-catalytic esterification reaction with suitable acids or anhydrides, such as phthalic acid or phthalic anhydride, to produce di-octyl esters of high quality, high plasticizing efficiency and relatively low volatility.

Having set forth its general nature, the invention will best be understood from the following more detailed description in which reference will be made to the accompanying drawing. The description that follows is an embodiment wherein both propylene and normal butylene streams are fed to the polymerization unit. It is to be understood that the invention is not restricted to the employment of these two streams, and that in another embodiment propylene alone or propylene-ethylene mixtures may be employed substantially without any butylene as feed to the polymerization plant.

Referring now to the figure, C₃ and C₄ olefin streams which have been previously fractionated in suitable equipment in a light ends plant, and which may have resulted from catalytic or thermal cracking of gas oil or other suitable material, are passed through lines 1 and 2 through isobutylene extraction units 3 and 4, wherein the streams are suitably treated in a conventional manner to remove isobutylene. Sulfuric acid of about 60–70% is suitable, other agents may be benzene-sulfonic acid and cresol, and the like. From isobutylene extractors 3 and 4, the streams are passed into polymerization unit 5 wherein the olefins are polymerized in the presence of a calcined phosphoric acid-kieselguhr catalyst. The reaction conditions within the polymerization plant 5, which may be operated in one or more stages at temperatures of about 380° to 500° F., pressures of about 200 to 1200 p. s. i. g. and feed rates of 0.5–6.0 v. liq./v. reaction space/hr. The ratio of $C_3$ to normal $C_4$ olefins may vary from 100/1 to 2/1, though, of course, all $C_4$ olefins may be excluded.

The total polymerizate from unit 5 is passed via line 6 to still 7 wherein light material is taken overhead as a heads cut through line 8. The heart cut, corresponding to the heptene fraction, is withdrawn through line 10. This is the fraction boiling between 165° and 215° F. at atmospheric pressures, and may have a heptene content of between 85 and 100%. The olefin is passed through line 10 to mixer 14, wherein cobalt naphthenate or oleate or other suitable catalyst is added through line 16 in such proportions that the amount of cobalt in solution is about 0.15–0.3 wt. percent of the total liquid. The mixture is then pumped to preheater 18 wherein it is brought to the desired temperature range and then discharged via line 20 to the bottom of primary carbonylation reactor 22. Reactor 22 comprises a high pressure reactor vessel which may, if desired, be packed with non-catalytic material such as ceramic rings, porcelain or quartz chips, pumice and the like. It may also be divided into discrete packed zones separated by any suitable means such as support grids, etc. or it may comprise but a single packed zone, or it may contain no packing.

A stream of synthesis gas comprising $H_2$ and CO in the approximate ratio of 0.5/1 to 2/1 volumes $H_2$/CO, preferably 1.0–1.2 to 1, is fed into reactor 22 through line 24. The synthesis gas stream is a composite of fresh gas and recycle, and flows upwardly with the olefin feed through reactor 22. The latter is preferably operated at a pressure of about 2000–4000 p. s. i. g., preferably 2500–3500 p. s. i. g. and at a carefully controlled temperature range of 250°–450° F., preferably between 300°–360° F. The rate of flow of synthesis gases and of olefin through reactor 22 is so regulated that the desired conversion level of olefin is obtained. These conditions include an olefin fresh feed rate of about 0.3–1.0 v./v./hr. or even higher, fresh synthesis gas feed rates of 1000–10,000 cubic feet/barrel of olefin, and a nominal residence time of about 1–3 hours.

The carbonylation reaction may be carried out substantially adiabatically, that is, no external cooling means such as tubes or coils need be provided, but cooling and temperature control of the highly exothermic reaction is carried out by recycle of a portion of the product, as described below. Liquid oxygenated reaction products containing catalyst in solution, as well as unreacted synthesis gases are withdrawn from an upper portion of high pressure reactor 22 and transferred through line 26 and cooler 28 to high pressure separator 32 where unreacted gases are withdrawn overhead through line 34, scrubbed in scrubber 36 of entrained liquid, and preferably recycled to reactor 22 via lines 38 and 24. A portion of the recycle may be purged through line 40 to maintain the desired $H_2$/CO ratio in the feed.

Liquid carbonylation product containing dissolved therein relatively high concentrations of cobalt carbonyl is withdrawn from separator 32 via line 42. A portion of this stream may be recycled to reactor 22 via line 44 to aid in the cooling and maintenance of temperature control of the primary carbonylation stage. Preferably recycle liquid product is injected at various levels within reactor 22 to obtain close temperature control throughout the whole reactor. Approximately 400–500 volume percent of liquid reaction product on the fresh olefin feed may be recycled for this purpose. The temperature of such recycled material is generally dependent on that of the atmosphere, and may be about 30°–100° F.

The balance of the primary reaction product not recycled to reactor 22, which may comprise, beside desired octyl aldehydes, also unreacted olefins, secondary reaction products, and dissolved cobalt carbonyls, is withdrawn through pressure release valve 46 and line 48 and passed to decobalting zone 50. Within decobalter 50, soluble cobalt carbonyl is removed from the aldehyde product prior to high pressure hydrogenation in order to prevent its decomposition in the subsequent hydrogenation stage with consequent fouling of coils and reactor plugging. The decomposition of the cobalt carbonyl is obtained by heating the aldehyde product by such means as steam coils, etc. to about 300°–350° F. at a pressure just high enough to keep the components in the liquid phase. Pressures in the neighborhood of 100–150 p. s. i. g. are preferred. The product containing catalyst in solution is injected into decobalter 50 through line 48 and stripping gas, such as $H_2$, may be added through line 52 to aid in decreasing the CO partial pressure. If desired, it may be advantageous to operate with two or more decobalters, switching the stream from one to the other as the one in service accumulates excessive quantities of cobalt metal. The gas stream comprising stripping gas and CO may be removed overhead from 50 through line 54 and used as desired.

The liquid aldehyde product now substantially free of dissolved catalyst is withdrawn from 50 through line 56 and passed through filter 58 for removal of any suspended cobalt. The filtered solution is withdrawn from 58 and passed through preheater 60 to the bottom portion of hydrogenation reactor 64 via line 62. Simultaneously, hydrogen is supplied to 64 through line 66 in proportions sufficient to convert the aldehydic product into octyl alcohols. Hydrogenator 64 may contain a mass of any conventional hydrogenation catalyst, such as nickel, copper chromite, a sulfactive catalyst such as tungsten, nickel or molybdenum sulfide, preferably supported on carriers such as pumice, charcoal, etc. Reactor 64 is preferably operated at temperatures of about 400°–550° F. and pressures of about 2500–3500 p. s. i. g.

The products from the hydrogenation reactor and unreacted hydrogen may be withdrawn overhead through line 68, passed through cooler 70 and high pressure separator 72, whence $H_2$ is removed overhead through 74 for recycle. The liquid product is withdrawn from separator 72 through line 76 and, after passing through conventional low pressure separators and stabilizers (not shown), is passed to hydrocarbon still 78, wherein are distilled overhead low boiling products, mostly hydrocarbons boiling below 210°–215° F. These materials are removed through line 80 as a heads cut and may be used as gasoline blending agents. The bottoms from this primary distillation are withdrawn from hydrocarbon still 78 via line 82 and sent to alcohol still 84 where an octyl cut boiling within the range of 350° to 390° F. at atmospheric pressures is taken. However, it may be desirable to distill alcohols at reduced pressure. The alcohols are withdrawn overhead from still 84 through line 86 and sent to storage tank 88, from whence they may be sent, if so desired, to an esterification plant for conversion into a di-octyl ester, such as di-octyl phthalate, all in a manner known per se. High boiling bottoms from 84 may be withdrawn through line 90 and may be used in any desired manner, such as cracking stock, fuel, etc. or they may be further processed and distilled at subatmospheric pressures to recover valuable oxygenated organic products.

The iso-octyl alcohols prepared in accordance with the procedure described were found to contain substantial of certain primary octyl alcohols not heretofore known, namely, 3,4-dimethyl hexanol-1 and 4,5-dimethyl hexanol-1. A third principal constituent, 3,5-dimethyl hexanol-1 is known in the literature. This latter isomer, which is theoretically derivable by reacting a co-polymerizate of propylene with isobutylene, is unexpectedly produced in large amounts even when isobutylene is carefully excluded from the polymerization feed.

Thus, studies that have been carried out to determine the structural composition of the iso-octyl alcohol isomers prepared by the heretofore described process, such studies including the combined techniques of cracking the stearic acid esters, analyzing the resulting olefins for constitution by infra red analysis, and hydrogenating and analyzing the resulting paraffins for individual compounds. An alcohol mixture prepared in accordance with the above process, wherein the olefin feed to the polymerization plant constituted about 10% normal butylenes and 90% propylene and wherein isobutylene was rigidly excluded, analyzed as follows:

| | Percent |
|---|---|
| 3,5-dimethyl hexanol-1 | 30 |
| 4,5-dimethyl hexanol-1 | 26 |
| 3,4-dimethyl hexanol-1 | 18 |
| 3- and/or 5-methyl heptanol-1 | 17 |
| 5,5-dimethyl hexanol-1 | 1.5 |

It will be noted that the 3,5-; 3,4- and 4,5-dimethyl hexanols-1 composed three-quarters of the total mixture. The remaining one-quarter included small amounts of methyl heptanols and other isomers, which being neither desirable nor objectionable and hence can scarcely be regarded as characterizing the mixture. Certain octyl alcohol isomers, however, which are present when isobutylene is present in the feed to the polymerization unit, have very undesirable properties and are preferably excluded from the mixture. In particular, 5,5-dimethyl hexanol-1 and also 3,4,4-trimethyl pentanol-1 must be avoided by excluding isobutylene from the polymerization feed and/or rejecting, by fractional distillation, the lower boiling portion of the $C_7$ polymer, should any isobutylene, even in small proportions, be used in the polymerization feed.

The octyl alcohol mixture prepared from the $C_7$ polymer may be further described as a mixture of dimethyl hexanols-1 having essentially no alkyl groups in the -2 position and having not more than one substituent methyl group in any other carbon atom (the usual terminal methyl group being considered here as an integral part of the carbon chain rather than as a substituent group). Iso-octyl alcohol mixtures comprising the constitution of the present invention can readily be distinguished from alcohols derived by carbonylating olefins derived from the hydrocarbon synthesis reaction or from cracking of wax by virtue of a characteristic shoulder on the long wave length side of the 7.25 micron "methyl" band in its infra-red absorption spectrum and relative intensities of the 7.25 micron band itself, serve also to characterize the octyl alcohol mixture of the present invention.

As has been indicated above, desirable compositions of an iso-octyl alcohol mixture suitable as an intermediate for plasticizers should contain an absolute minimum of the 5,5-dimethyl hexanol-1 and 3,4,4-trimethyl pentanol-1 isomers. Suitable mixtures of dimethyl hexanol showing particularly advantageous plasticizing properties may have the following composition:

| | Percent |
|---|---|
| 3,5-dimethyl hexanol-1 | 15 to 45 |
| 4,5-dimethyl hexanol-1 | 14 to 40 |
| 3,4-dimethyl hexanol-1 | 9 to 27 |

The present invention may be further illustrated by the following tables, which clearly demonstrate the superior alcohols and esters obtained when alcohol product comprising isomers of the present invention is produced as a result of the carbonylation reaction. In Table I are shown the yields of $C_7$ olefin, the viscosities of the corresponding octyl alcohols, and the plasticizing efficiencies of the di-octyl phthalates when the polymerization unit is operated at relatively high temperatures of 450°–500° F., and Table II shows the results at low temperature (380°–425° F.) polymerization conditions. Polymerization was carried out in the presence of a phosphoric acid kieselguhr catalyst at 1000 p. s. i g. and a feed rate of about 0.3 gal./hr./lb. of catalyst and the product boiling in the range of from about 165° F. to 215° F. was subjected to the carbonylation reaction.

TABLE I

*Effect of butene content of polymer plant feed on plasticizer efficiency of di-octyl phthalates under high temperature polymerization conditions.*

| Feed to polymer plant, mol percent total olefin | | | Alcohol viscosity, centistokes at 68° F. | Modulus at 50% elongation (30° F.), p. s. i.[1] | Polymerization temp., °F. | Vol. percent $C_7$ in total polymer |
|---|---|---|---|---|---|---|
| Propylene | n-Butenes | i-Butenes | | | | |
| 100 | 0 | 0 | 12.1 | 2,145 | 451 | 5.3 |
| 90 | 10 | 0 | 12.3 | 2,115 | 450 | 10.5 |
| 80 | 20 | 0 | 12.5 | 2,170 | 496 | 18.5 |
| 80 | 20 | 0 | 12.6 | ------ | 446 | 14.0 |
| 90 | 0 | 10 | 12.4 | 2,240 | 450 | 14.4 |
| 80 | 0 | 20 | 12.7 | 2,350 | 446 | 24.8 |
| 98 | 1 | 1 | 12.6 | 2,225 | 449 | 6.4 |
| 90 | 6 | 4 | 12.6 | 2,110 | 452 | 11.5 |
| 45 | 37 | 18 | 12.8 | ------ | 450 | 28.9 |

In the above tests the vinyl resin compound contained 32.7% (wt.) plasticizer.
[1] Plasticizer concentrations 31.6 wt. percent; when corrected to 32.7%, value of about 2,020 p. s. i. indicated.

TABLE II

*Effect of butene content of polymer plant feed on plasticizer efficiency of $C_8$ phthalates under low temperature polymerization conditions*

| Feed to polymerization, mol percent on total olefins | | | Alcohol Viscosity, Centistokes at 68° F. | Modulus at 50% elongation (30° F.) | Polymerization temp., °F. | Vol. percent $C_7$ in total polymer |
|---|---|---|---|---|---|---|
| Propylene | n-Butenes | i-Butene | | | | |
| 97.6 | 1.6 | 0.8 | ----- | ----- | 421 | 6.5 |
| 86.9 | 8.7 | 4.4 | 12.75 | 2,240 | 422 | 10.5 |
| 72.8 | 18.1 | 9.1 | ----- | ----- | 426 | 15.5 |
| 89.4 | 10.6 | 0 | | | | 6.7 |
| 90.2 | 9.8 | 0 | 12.6 | 2,140 | 405–410 | 7.7 |
| 89.3 | 10.7 | 0 | | | | 9.1 |
| 87.4 | 8.4 | 4.2 | ----- | ----- | 404 | 8.5 |
| 45.0 | (ca.) 37 | (ca.) 18 | 13.4 | 2,255 | (ca.) 380 | ------ |
| 90.0 | 6.7 | 3.3 | 12.9 | 2,240 | (ca.) 400 | ------ |

The determination of the tensile, or stress-strain (modulus) properties of the plasticized vinyl blends were carried out by the standard method of extending dumb-bell shaped specimens at 30° F. and recording the stress value at 50% elongation and break point as well as percent extension at the point of rupture.

The above tables and results show the following:

1. The lowest modulus, that is, the most desirable stress/strain properties, were shown by di-iso-octyl phthalates obtained from $C_7$ olefins produced by maintaining the feed to the polymerization plant substantially free of butylenes and feeding substantially only propylene. However, the yield of $C_7$ olefins on the total polymer was low.

2. For a given quantity of butylenes in the feed to the polymer plant, at a given polymerization temperature level, normal butylenes yield phthalic esters of lower modulus than isobutylene.

3. The lower viscosities of the propylene and the propylene-n-butylene copolymer-derived alcohols appear to be associated with the superior stress/strain characteristics of the corresponding esters, and for a given amount of butenes in the feed, alcohols derived from propylene-isobutylene copolymers have higher viscosities than those derived from propylene-n-butylene copolymers.

4. Plasticizer properties become less desirable at polymerization conditions under which $C_7$ yield in the total polymer increases.

5. Octyl alcohol mixtures containing principally 3,4-; 3,5-; and 4,5-dimethyl hexanol-1, which isomers comprise a major portion of the alcohol produced when isobutylene is excluded from the feed to the polymer plant, constitute an alcohol product of substantially lower viscosity leading to lower ester-plasticizer modulus characteristics than the alcohol product comprising 3,4,4-trimethyl pentanol-1 and 5,5-dimethyl pentanol-1 which is produced when isobutylene is included in the feed.

Summarizing, it has been shown that an octyl alcohol composition comprising substantially dimethyl hexanols having essentially no alkyl groups in the -2 position and having not more than one substituent methyl group on any other carbon atom is a highly desirable intermediate for the preparation of plasticizers. Furthermore, it has been shown that the most desirable polymer plant feed stock, from the standpoint of octyl alcohol quality, for the production of $C_7$ olefins for conversion to octyl alcohols for use in plasticizer formulation is one consisting of essentially propylene as polymerizable olefin. In order to maximize yields of $C_7$ olefin when employing propylene as a feed, it is desirable to work at as high a polymerization temperature as possible. It has been shown that yields of $C_7$ olefins are increased by including butylenes along with propylene, but the alcohol and ester product quality decreases from a plasticizing efficiency standpoint, this decrease being more marked at higher temperature levels of polymerization. Exclusion of isobutylene from the butylenes admitted with propylene has the pronounced effect of up-grading alcohol quality at all temperature levels of polymerization, but especially at the higher temperatures. In addition, two hitherto unknown iso-octyl alcohols, namely 3,4- and 4,5-dimethyl hexanols-1 have been described.

The ester product of the present invention, prepared by esterifying in a conventional manner the isooctyl alcohol product produced, consists essentially of a mixture of di(3,4-); di(3,5-); and di(4,5 dimethyl hexyl) phthalate, and the product had a kinematic viscosity, at 68° F., of 70.0 The phthalates prepared from polymer feeds from which the isobutylene was not excluded all were characterized by higher kinematic viscosities, ranging from 72.5 to 79.6.

Furthermore, though in the preceding, reference is had specifically to the heptene fraction in the polymer cut, it may also be desirable to treat other fractions, such as the $C_{12}$ fractions of the polymerizate with CO and $H_2$ to obtain alcohols of superior detergency characteristics in accordance with the present invention. By normal butenes or butylenes, reference is had to butene-1 and butene-2.

The foregoing description, though illustrating specific applications of the invention, it is not intended to exclude other modifications obvious to those skilled in the art and which are within the scope of the invention.

This application is a continuation-in-part of Serial No. 169,404 filed June 21, 1950, now abandoned.

What is claimed is:

1. The process of producing alcohols which comprises passing to an acid polymerization zone a light gaseous hydrocarbon feed comprising at least a major proportion of propylene and substantially free of isobutylene, contacting said hydrocarbon feed with an acid polymerization catalyst under polymerization conditions of temperature and pressure conducive to formation of liquid polymeric olefinic hydrocarbons, separating a fraction of said olefinic product, passing said fraction to a carbonylation zone, treating said separated fraction in said zone with CO and $H_2$ in the presence of a cobalt carbonylation catalyst at elevated temperatures and pressures whereby an aldehyde product containing one more carbon atom than the feed to said carbonylation zone is obtained, reducing said aldehyde product in a hydrogenation zone and recovering a superior alcohol product.

2. In the process wherein olefins are polymerized in a polymerization zone to form olefinic polymers and the polymers subjected to the aldehyde synthesis reaction in the presence of carbon monoxide, hydrogen and a cobalt carbonylation catalyst, and the aldehydes hydrogenated to alcohols, the improvement which comprises passing to said polymerization zone a light olefinic hydrocarbon feed comprising at least a major proportion of propylene and substantially free of isobutylene, contacting said hydrocarbon feed with an acid polymerization catalyst under polymerization conditions of temperature and pressure conducive to formation of liquid polymeric olefinic hydrocarbons including heptenes, separating a fraction of said olefinic product and passing said fraction to said carbonylation zone.

3. The process of claim 2 wherein said polymerization conditions comprise temperatures of about 380 to about 500° F. and pressures of from about 200 to about 1200 p. s. i. g.

4. The process of claim 2 wherein said gaseous hydrocarbon feed consists essentially of propylene.

5. The process of claim 2 wherein said gaseous hydrocarbon feed comprises a major proportion of propylene and a minor proportion of normal butylenes.

6. The process of claim 2 wherein said heptene fraction is passed to said carbonylation zone.

7. In the process of producing primary octyl alcohols wherein low molecular weight olefins are polymerized in a polymerization zone to form olefinic polymers including a heptene fraction, and said heptene fraction subjected to the aldehyde synthesis reaction in a carbonylation zone and the aldehydes produced are subsequently hydrogenated to octyl alcohols, the improvement which comprises passing to said polymerization zone a light gaseous hydrocarbon feed comprising at least a major proportion of propylene and substantially free of isobutylene, contacting said feed with an acid polymerization catalyst under polymerization conditions of temperature and pressure conducive to formation of liquid polymeric olefinic hydrocarbons, separating a heptene fraction boiling in the range of from about 165° to about 215° F. from said olefinic product and passing said fraction to said carbonylation zone.

8. The process of claim 7 wherein said feed to said polymerization zone comprises a major proportion of propylene and a minor proportion of normal butylenes.

9. A mixture of primary octyl alcohols prepared in accordance with the process of claim 7.

10. A mixture of primary octyl phthalates prepared by first polymerizing a light gaseous hydrocarbon feed comprising a major proportion of propylene and a minor proportion of normal butylenes, said hydrocarbon feed being substantially free of isobutylene, to form an olefinic polymer including a heptene fraction, separating a heptene fraction from said olefinic polymer and subjecting said fraction to the aldehyde synthesis reaction in a carbonylation zone, whereby an aldehyde product is formed, hydrogenating the thus formed aldehyde product to the corresponding alcohol and esterifying said alcohol to form the corresponding phthalate.

References Cited in the file of this patent

UNITED STATES PATENTS

| | | |
|---|---|---|
| 2,557,701 | Smith | June 19, 1951 |
| 2,610,201 | Rutherford | Sept. 9, 1952 |
| 2,625,527 | Smith et al. | Jan. 13, 1953 |
| 2,632,021 | Robinson et al. | Mar. 17, 1953 |
| 2,637,746 | Parker | May 5, 1953 |
| 2,658,923 | Fischer | Nov. 10, 1953 |